US012693965B2

(12) United States Patent　　　　(10) Patent No.:　US 12,693,965 B2
Rooney　　　　　　　　　　　　　　(45) Date of Patent:　　　Jul. 28, 2026

(54) APPARATUSES AND METHODS FOR CONTROLLER SIGNALING OF REFRESH OPERATIONS

(71) Applicant: Micron Technology, Inc., Boise, ID (US)

(72) Inventor: Randall J. Rooney, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,730

(22) Filed: Jul. 16, 2024

(65) Prior Publication Data

US 2025/0173255 A1　　May 29, 2025

Related U.S. Application Data

(60) Provisional application No. 63/603,210, filed on Nov. 28, 2023.

(51) Int. Cl.
G06F 12/02　　　　(2006.01)

(52) U.S. Cl.
CPC ...... G06F 12/02 (2013.01); *G06F 2212/1041* (2013.01)

(58) Field of Classification Search
CPC ............. G06F 12/02; G06F 2212/1041; G06F 12/0207; G11C 11/40622; G11C 11/40615; G11C 11/4085; G11C 11/406
See application file for complete search history.

(56) References Cited

U.S. PATENT DOCUMENTS

| | | |
|---|---|---|
| 5,225,839 A | 7/1993 | Okurowski et al. |
| 5,299,159 A | 3/1994 | Balistreri et al. |
| 5,654,929 A | 8/1997 | Mote |
| 5,699,297 A | 12/1997 | Yamazaki et al. |
| 5,867,442 A | 2/1999 | Kim et al. |
| 5,933,377 A | 8/1999 | Hidaka |
| 5,943,283 A | 8/1999 | Wong et al. |
| 5,956,288 A | 9/1999 | Bermingham et al. |
| 5,959,923 A | 9/1999 | Matteson et al. |

(Continued)

FOREIGN PATENT DOCUMENTS

| | | |
|---|---|---|
| BE | 825677 A | 8/1975 |
| CN | 1841551 A | 10/2006 |

(Continued)

OTHER PUBLICATIONS

U.S. Appl. No. 18/746,551 titled "Apparatuses and Methods for Direct Refresh Management Attack Identification" filed Jun. 18, 2024, pp. all pages of the application as filed.

(Continued)

*Primary Examiner* — Michael Krofcheck
(74) *Attorney, Agent, or Firm* — Dorsey & Whitney LLP

(57)　　　　ABSTRACT

Apparatuses and methods for controller signaling of refresh operations. A memory may receive a first or a second type of refresh command. Responsive to the first type of refresh command a first type of refresh operation (e.g., a sequential refresh operation) may be performed. Responsive to the second type of refresh operation a second type of refresh operation (e.g., a targeted refresh operation) may be performed. This may allow the controller to have greater control over the timing of different types of refresh operation in the memory.

19 Claims, 5 Drawing Sheets

(56) References Cited

U.S. PATENT DOCUMENTS

| | | |
|---|---|---|
| 5,970,507 A | 10/1999 | Kato et al. |
| 5,999,471 A | 12/1999 | Choi |
| 5,999,473 A | 12/1999 | Harrington et al. |
| 6,002,629 A | 12/1999 | Kim et al. |
| 6,011,734 A | 1/2000 | Pappert |
| 6,061,290 A | 5/2000 | Shirley |
| 6,064,621 A | 5/2000 | Tanizaki et al. |
| 6,212,118 B1 | 4/2001 | Fujita |
| 6,298,413 B1 | 10/2001 | Christenson |
| 6,306,721 B1 | 10/2001 | Teo et al. |
| 6,310,806 B1 | 10/2001 | Higashi et al. |
| 6,310,814 B1 | 10/2001 | Hampel et al. |
| 6,363,024 B1 | 3/2002 | Fibranz |
| 6,392,952 B1 | 5/2002 | Chen et al. |
| 6,424,582 B1 | 7/2002 | Ooishi |
| 6,434,064 B2 | 8/2002 | Nagai |
| 6,452,868 B1 | 9/2002 | Fister |
| 6,490,216 B1 | 12/2002 | Chen et al. |
| 6,515,928 B2 | 2/2003 | Sato et al. |
| 6,535,950 B1 | 3/2003 | Funyu et al. |
| 6,535,980 B1 | 3/2003 | Kumar et al. |
| 6,563,757 B2 | 5/2003 | Agata |
| 6,567,340 B1 | 5/2003 | Nataraj et al. |
| 6,950,364 B2 | 9/2005 | Kim |
| 6,977,824 B1 | 12/2005 | Yang et al. |
| 7,002,868 B2 | 2/2006 | Takahashi |
| 7,057,960 B1 | 6/2006 | Fiscus et al. |
| 7,061,225 B2 | 6/2006 | Yang et al. |
| 7,061,780 B2 | 6/2006 | Yang et al. |
| 7,082,070 B2 | 7/2006 | Hong |
| 7,187,607 B2 | 3/2007 | Koshikawa et al. |
| 7,203,113 B2 | 4/2007 | Takahashi et al. |
| 7,203,115 B2 | 4/2007 | Eto et al. |
| 7,209,402 B2 | 4/2007 | Shinozaki et al. |
| 7,215,588 B2 | 5/2007 | Lee |
| 7,444,577 B2 | 10/2008 | Best et al. |
| 7,551,502 B2 | 6/2009 | Dono et al. |
| 7,565,479 B2 | 7/2009 | Best et al. |
| 7,692,993 B2 | 4/2010 | Iida et al. |
| 7,830,742 B2 | 11/2010 | Han |
| 8,174,921 B2 | 5/2012 | Kim et al. |
| 8,400,805 B2 | 3/2013 | Yoko |
| 8,526,260 B2 | 9/2013 | Pyeon |
| 8,572,423 B1 | 10/2013 | Isachar et al. |
| 8,625,360 B2 | 1/2014 | Iwamoto et al. |
| 8,681,578 B2 | 3/2014 | Narui |
| 8,756,368 B2 | 6/2014 | Best et al. |
| 8,811,100 B2 | 8/2014 | Ku |
| 8,862,973 B2 | 10/2014 | Zimmerman et al. |
| 8,938,573 B2 | 1/2015 | Greenfield et al. |
| 9,032,141 B2 | 5/2015 | Bains et al. |
| 9,047,978 B2 | 6/2015 | Bell et al. |
| 9,076,499 B2 | 7/2015 | Schoenborn et al. |
| 9,076,548 B1 | 7/2015 | Park et al. |
| 9,087,602 B2 | 7/2015 | Youn et al. |
| 9,117,544 B2 | 8/2015 | Bains et al. |
| 9,123,447 B2 | 9/2015 | Lee et al. |
| 9,153,294 B2 | 10/2015 | Kang |
| 9,190,137 B2 | 11/2015 | Kim et al. |
| 9,190,139 B2 | 11/2015 | Jung et al. |
| 9,236,110 B2 | 1/2016 | Bains et al. |
| 9,251,885 B2 | 2/2016 | Greenfield et al. |
| 9,286,964 B2 | 3/2016 | Halbert et al. |
| 9,299,400 B2 | 3/2016 | Bains et al. |
| 9,311,984 B1 | 4/2016 | Hong et al. |
| 9,311,985 B2 | 4/2016 | Lee et al. |
| 9,324,398 B2 | 4/2016 | Jones et al. |
| 9,384,821 B2 | 7/2016 | Bains et al. |
| 9,390,782 B2 | 7/2016 | Best et al. |
| 9,396,786 B2 | 7/2016 | Yoon et al. |
| 9,406,358 B1 | 8/2016 | Lee |
| 9,412,432 B2 | 8/2016 | Narul et al. |
| 9,418,723 B2 | 8/2016 | Chishti et al. |
| 9,424,907 B2 | 8/2016 | Fujishiro |
| 9,478,316 B1 | 10/2016 | Ryu |
| 9,484,079 B2 | 11/2016 | Lee |
| 9,514,850 B2 | 12/2016 | Kim |
| 9,570,143 B2 | 2/2017 | Lim et al. |
| 9,570,201 B2 | 2/2017 | Morgan et al. |
| 9,640,242 B1 | 5/2017 | Lo et al. |
| 9,646,672 B1 | 5/2017 | Kim et al. |
| 9,653,139 B1 | 5/2017 | Park |
| 9,672,889 B2 | 6/2017 | Lee et al. |
| 9,685,240 B1 | 6/2017 | Park |
| 9,691,466 B1 | 6/2017 | Kim |
| 9,697,913 B1 | 7/2017 | Mariani et al. |
| 9,734,887 B1 | 8/2017 | Tavva |
| 9,741,409 B2 | 8/2017 | Jones et al. |
| 9,741,421 B1 | 8/2017 | Hedden |
| 9,741,447 B2 | 8/2017 | Akamatsu |
| 9,747,971 B2 | 8/2017 | Bains et al. |
| 9,761,297 B1 | 9/2017 | Tomishima |
| 9,786,351 B2 | 10/2017 | Lee et al. |
| 9,799,391 B1 | 10/2017 | Wei |
| 9,805,782 B1 | 10/2017 | Liou |
| 9,805,783 B2 | 10/2017 | Ito et al. |
| 9,812,185 B2 | 11/2017 | Fisch et al. |
| 9,818,469 B1 | 11/2017 | Kim et al. |
| 9,831,003 B2 | 11/2017 | Sohn et al. |
| 9,865,326 B2 | 1/2018 | Bains et al. |
| 9,865,328 B1 | 1/2018 | Desimone et al. |
| 9,892,779 B2 | 2/2018 | Kang et al. |
| 9,922,694 B2 | 3/2018 | Akamatsu |
| 9,928,896 B1 | 3/2018 | Kim et al. |
| 9,934,143 B2 | 4/2018 | Bains et al. |
| 9,953,696 B2 | 4/2018 | Kim |
| 9,972,377 B2 | 5/2018 | Oh et al. |
| 9,978,430 B2 | 5/2018 | Seo et al. |
| 10,003,328 B1 | 6/2018 | Mn et al. |
| 10,020,045 B2 | 7/2018 | Riho |
| 10,020,046 B1 | 7/2018 | Uemura |
| 10,032,501 B2 | 7/2018 | Ito et al. |
| 10,049,716 B2 | 8/2018 | Proebsting |
| 10,083,737 B2 | 9/2018 | Bains et al. |
| 10,090,038 B2 | 10/2018 | Shin |
| 10,134,461 B2 | 11/2018 | Bell et al. |
| 10,141,042 B1 | 11/2018 | Richter |
| 10,147,472 B2 | 12/2018 | Jones et al. |
| 10,153,031 B2 | 12/2018 | Akamatsu |
| 10,170,174 B1 | 1/2019 | Ito et al. |
| 10,192,608 B2 | 1/2019 | Morgan |
| 10,210,925 B2 | 2/2019 | Bains et al. |
| 10,297,305 B1 | 5/2019 | Moon et al. |
| 10,297,307 B1 | 5/2019 | Raad et al. |
| 10,339,994 B2 | 7/2019 | Ito et al. |
| 10,381,327 B2 | 8/2019 | Ramachandra et al. |
| 10,418,978 B1 | 9/2019 | Au Yeung et al. |
| 10,446,256 B2 | 10/2019 | Ong et al. |
| 10,468,076 B1 | 11/2019 | He et al. |
| 10,490,250 B1 | 11/2019 | Ito et al. |
| 10,490,251 B2 | 11/2019 | Wolff |
| 10,504,577 B1 | 12/2019 | Alzheimer |
| 10,510,396 B1 | 12/2019 | Notani et al. |
| 10,572,377 B1 | 2/2020 | Zhang et al. |
| 10,573,370 B2 | 2/2020 | Ito et al. |
| 10,607,679 B2 | 3/2020 | Nakaoka |
| 10,672,449 B2 | 6/2020 | Ito et al. |
| 10,685,696 B2 | 6/2020 | Brown et al. |
| 10,699,796 B2 | 6/2020 | Benedict et al. |
| 10,790,005 B1 | 9/2020 | He et al. |
| 10,825,505 B2 | 11/2020 | Rehmeyer |
| 10,832,792 B1 | 11/2020 | Penney et al. |
| 10,930,335 B2 | 2/2021 | Bell et al. |
| 10,943,636 B1 | 3/2021 | Wu et al. |
| 10,950,289 B2 | 3/2021 | Ito et al. |
| 10,957,377 B2 | 3/2021 | Noguchi |
| 10,964,378 B2 | 3/2021 | Ayyapureddi et al. |
| 10,978,132 B2 | 4/2021 | Rehmeyer et al. |
| 11,017,833 B2 | 5/2021 | Wu et al. |
| 11,062,754 B2 | 7/2021 | Ito et al. |
| 11,069,393 B2 | 7/2021 | Cowles et al. |
| 11,081,160 B2 | 8/2021 | Ito et al. |
| 11,222,683 B2 | 1/2022 | Rehmeyer |
| 11,222,686 B1 | 1/2022 | Noguchi |

(56) References Cited

U.S. PATENT DOCUMENTS

| | | | |
|---|---|---|---|
| 11,227,649 B2 | 1/2022 | Meier et al. |
| 11,264,079 B1 | 3/2022 | Roberts |
| 11,302,374 B2 | 4/2022 | Jenkinson et al. |
| 11,302,377 B2 | 4/2022 | Li et al. |
| 11,309,010 B2 | 4/2022 | Ayyapureddi |
| 11,309,012 B2 | 4/2022 | Meier et al. |
| 11,315,619 B2 | 4/2022 | Wolff |
| 11,315,620 B2 | 4/2022 | Ishikawa et al. |
| 11,320,377 B2 | 5/2022 | Chen et al. |
| 11,348,631 B2 | 5/2022 | Wu et al. |
| 11,380,382 B2 | 7/2022 | Zhang et al. |
| 11,386,946 B2 | 7/2022 | Ayyapureddi et al. |
| 11,417,383 B2 | 8/2022 | Jenkinson et al. |
| 11,532,346 B2 | 12/2022 | Brown et al. |
| 11,557,331 B2 | 1/2023 | Mitsubori et al. |
| 11,610,622 B2 | 3/2023 | Rehmeyer et al. |
| 11,615,831 B2 | 3/2023 | Yamamoto |
| 11,626,152 B2 | 4/2023 | Wu et al. |
| 11,688,452 B2 | 6/2023 | Nale et al. |
| 11,715,512 B2 | 8/2023 | Li et al. |
| 11,749,331 B2 | 9/2023 | Wu et al. |
| 11,798,610 B2 | 10/2023 | Cowles et al. |
| 11,810,612 B2 | 11/2023 | Roberts |
| 11,935,576 B2 | 3/2024 | Ishikawa et al. |
| 11,955,158 B2 | 4/2024 | Brown et al. |
| 12,002,501 B2 | 6/2024 | Noguchi |
| 12,112,787 B2 | 10/2024 | He et al. |
| 12,125,514 B2 | 10/2024 | Suzuki |
| 2001/0008498 A1 | 7/2001 | Ooishi |
| 2002/0026613 A1 | 2/2002 | Niiro |
| 2002/0181301 A1 | 12/2002 | Takahashi et al. |
| 2002/0191467 A1 | 12/2002 | Matsumoto et al. |
| 2003/0026161 A1 | 2/2003 | Yamaguchi et al. |
| 2003/0063512 A1 | 4/2003 | Takahashi et al. |
| 2003/0067825 A1 | 4/2003 | Shimano et al. |
| 2003/0081483 A1 | 5/2003 | De et al. |
| 2003/0123301 A1 | 7/2003 | Jang et al. |
| 2003/0161208 A1 | 8/2003 | Nakashima et al. |
| 2003/0193829 A1 | 10/2003 | Morgan et al. |
| 2003/0231540 A1 | 12/2003 | Lazar et al. |
| 2004/0004856 A1 | 1/2004 | Sakimura et al. |
| 2004/0008544 A1 | 1/2004 | Shinozaki et al. |
| 2004/0022093 A1 | 2/2004 | Lee |
| 2004/0024955 A1 | 2/2004 | Patel |
| 2004/0085835 A1 | 5/2004 | Ahn et al. |
| 2004/0114446 A1 | 6/2004 | Takahashi et al. |
| 2004/0130959 A1 | 7/2004 | Kawaguchi |
| 2004/0160838 A1 | 8/2004 | Pelley et al. |
| 2004/0184323 A1 | 9/2004 | Mori et al. |
| 2004/0218431 A1 | 11/2004 | Chung et al. |
| 2005/0002254 A1 | 1/2005 | Otsuka et al. |
| 2005/0002268 A1 | 1/2005 | Otsuka et al. |
| 2005/0041502 A1 | 2/2005 | Perner |
| 2005/0105362 A1 | 5/2005 | Choi et al. |
| 2005/0108460 A1 | 5/2005 | David |
| 2005/0213408 A1 | 9/2005 | Shieh |
| 2005/0243627 A1 | 11/2005 | Lee et al. |
| 2005/0249009 A1 | 11/2005 | Shieh |
| 2005/0265104 A1 | 12/2005 | Remaklus et al. |
| 2006/0018174 A1 | 1/2006 | Park et al. |
| 2006/0050591 A1 | 3/2006 | Park |
| 2006/0083099 A1 | 4/2006 | Bae et al. |
| 2006/0087903 A1 | 4/2006 | Riho et al. |
| 2006/0104139 A1 | 5/2006 | Hur et al. |
| 2006/0176744 A1 | 8/2006 | Stave |
| 2006/0198220 A1 | 9/2006 | Yoon et al. |
| 2006/0215474 A1 | 9/2006 | Hokenmaier |
| 2006/0233012 A1 | 10/2006 | Sekiguchi et al. |
| 2006/0262616 A1 | 11/2006 | Chen |
| 2006/0262617 A1 | 11/2006 | Lee |
| 2006/0268643 A1 | 11/2006 | Schreck et al. |
| 2007/0002651 A1 | 1/2007 | Lee |
| 2007/0008799 A1 | 1/2007 | Dono et al. |
| 2007/0014175 A1 | 1/2007 | Min et al. |
| 2007/0028068 A1 | 2/2007 | Golding et al. |
| 2007/0030746 A1 | 2/2007 | Best et al. |
| 2007/0033338 A1 | 2/2007 | Tsern |
| 2007/0033339 A1 | 2/2007 | Best et al. |
| 2007/0058462 A1 | 3/2007 | Blodgett |
| 2007/0106838 A1 | 5/2007 | Choi |
| 2007/0147154 A1 | 6/2007 | Lee |
| 2007/0165042 A1 | 7/2007 | Yagi |
| 2007/0171750 A1 | 7/2007 | Oh |
| 2007/0237016 A1 | 10/2007 | Miyamoto et al. |
| 2007/0263442 A1 | 11/2007 | Cornwell et al. |
| 2007/0268768 A1 | 11/2007 | Kawakubo |
| 2007/0297252 A1 | 12/2007 | Singh |
| 2008/0028137 A1 | 1/2008 | Schakel et al. |
| 2008/0028260 A1 | 1/2008 | Oyagi et al. |
| 2008/0031068 A1 | 2/2008 | Yoo et al. |
| 2008/0126893 A1 | 5/2008 | Harrand et al. |
| 2008/0130394 A1 | 6/2008 | Dono et al. |
| 2008/0181048 A1 | 7/2008 | Han |
| 2008/0212386 A1 | 9/2008 | Riho |
| 2008/0224742 A1 | 9/2008 | Pomichter |
| 2008/0253212 A1 | 10/2008 | Iida et al. |
| 2008/0253213 A1 | 10/2008 | Sato et al. |
| 2008/0266990 A1 | 10/2008 | Loeffler |
| 2008/0270683 A1 | 10/2008 | Barth et al. |
| 2008/0306723 A1 | 12/2008 | De et al. |
| 2008/0316845 A1 | 12/2008 | Wang et al. |
| 2009/0021999 A1 | 1/2009 | Tanimura et al. |
| 2009/0052264 A1 | 2/2009 | Hong et al. |
| 2009/0059641 A1 | 3/2009 | Jeddeloh |
| 2009/0073760 A1 | 3/2009 | Betser et al. |
| 2009/0147606 A1 | 6/2009 | Daniel |
| 2009/0161468 A1 | 6/2009 | Fujioka |
| 2009/0168571 A1 | 7/2009 | Pyo et al. |
| 2009/0185440 A1 | 7/2009 | Lee |
| 2009/0201752 A1 | 8/2009 | Riho et al. |
| 2009/0228739 A1 | 9/2009 | Cohen et al. |
| 2009/0251971 A1 | 10/2009 | Futatsuyama |
| 2009/0296510 A1 | 12/2009 | Lee et al. |
| 2010/0005217 A1 | 1/2010 | Jeddeloh |
| 2010/0005376 A1 | 1/2010 | Laberge et al. |
| 2010/0061153 A1 | 3/2010 | Yen et al. |
| 2010/0074042 A1 | 3/2010 | Fukuda et al. |
| 2010/0097870 A1 | 4/2010 | Kim et al. |
| 2010/0110809 A1 | 5/2010 | Kobayashi et al. |
| 2010/0110810 A1 | 5/2010 | Kobayashi |
| 2010/0124138 A1 | 5/2010 | Lee et al. |
| 2010/0128547 A1 | 5/2010 | Kagami |
| 2010/0131812 A1 | 5/2010 | Mohammad |
| 2010/0141309 A1 | 6/2010 | Lee |
| 2010/0157693 A1 | 6/2010 | Iwai et al. |
| 2010/0182862 A1 | 7/2010 | Teramoto |
| 2010/0182863 A1 | 7/2010 | Fuklage |
| 2010/0329069 A1 | 12/2010 | Ito et al. |
| 2011/0007592 A1 | 1/2011 | Tashiro |
| 2011/0026290 A1 | 2/2011 | Noda et al. |
| 2011/0055495 A1 | 3/2011 | Remaklus et al. |
| 2011/0069572 A1 | 3/2011 | Lee et al. |
| 2011/0122987 A1 | 5/2011 | Neyer |
| 2011/0134715 A1 | 6/2011 | Norman |
| 2011/0170353 A1 | 7/2011 | Nguyen |
| 2011/0216614 A1 | 9/2011 | Hosoe |
| 2011/0225355 A1 | 9/2011 | Kajigaya |
| 2011/0299352 A1 | 12/2011 | Fujishiro et al. |
| 2011/0310648 A1 | 12/2011 | Iwamoto et al. |
| 2012/0014199 A1 | 1/2012 | Narui |
| 2012/0059984 A1 | 3/2012 | Kang et al. |
| 2012/0151131 A1 | 6/2012 | Kilmer et al. |
| 2012/0155173 A1 | 6/2012 | Lee et al. |
| 2012/0155206 A1 | 6/2012 | Kodama et al. |
| 2012/0213021 A1 | 8/2012 | Riho et al. |
| 2012/0254472 A1 | 10/2012 | Ware et al. |
| 2012/0287727 A1 | 11/2012 | Wang |
| 2012/0307582 A1 | 12/2012 | Marumoto et al. |
| 2012/0327734 A1 | 12/2012 | Sato |
| 2013/0003467 A1 | 1/2013 | Klein |
| 2013/0003477 A1 | 1/2013 | Park et al. |
| 2013/0028034 A1 | 1/2013 | Fujisawa |
| 2013/0051157 A1 | 2/2013 | Park |
| 2013/0051171 A1 | 2/2013 | Porter et al. |

(56) References Cited

U.S. PATENT DOCUMENTS

| | | |
|---|---|---|
| 2013/0077423 A1 | 3/2013 | Lee |
| 2013/0173971 A1 | 7/2013 | Zimmerman |
| 2013/0254475 A1 | 9/2013 | Perego et al. |
| 2013/0279284 A1 | 10/2013 | Jeong |
| 2013/0304982 A1 | 11/2013 | Jung et al. |
| 2014/0006700 A1 | 1/2014 | Schaefer et al. |
| 2014/0006703 A1 | 1/2014 | Bains et al. |
| 2014/0006704 A1 | 1/2014 | Greenfield et al. |
| 2014/0013169 A1 | 1/2014 | Kobla et al. |
| 2014/0013185 A1 | 1/2014 | Kobla et al. |
| 2014/0016422 A1 | 1/2014 | Kim et al. |
| 2014/0022858 A1 | 1/2014 | Chen et al. |
| 2014/0043888 A1 | 2/2014 | Chen et al. |
| 2014/0050004 A1 | 2/2014 | Mochida |
| 2014/0078841 A1 | 3/2014 | Chopra |
| 2014/0078842 A1 | 3/2014 | Oh et al. |
| 2014/0089576 A1 | 3/2014 | Bains et al. |
| 2014/0089758 A1 | 3/2014 | Kwok et al. |
| 2014/0095780 A1 | 4/2014 | Bains et al. |
| 2014/0095786 A1 | 4/2014 | Moon et al. |
| 2014/0119091 A1 | 5/2014 | You et al. |
| 2014/0143473 A1 | 5/2014 | Kim et al. |
| 2014/0153315 A1 | 6/2014 | Kwon et al. |
| 2014/0156923 A1 | 6/2014 | Bains et al. |
| 2014/0169114 A1 | 6/2014 | Oh |
| 2014/0177370 A1 | 6/2014 | Halbert et al. |
| 2014/0181453 A1 | 6/2014 | Jayasena et al. |
| 2014/0185403 A1 | 7/2014 | Lai |
| 2014/0189228 A1 | 7/2014 | Greenfield et al. |
| 2014/0219042 A1 | 8/2014 | Yu et al. |
| 2014/0219043 A1 | 8/2014 | Jones et al. |
| 2014/0237307 A1 | 8/2014 | Kobla et al. |
| 2014/0241099 A1 | 8/2014 | Seo et al. |
| 2014/0254298 A1 | 9/2014 | Dally |
| 2014/0281206 A1 | 9/2014 | Crawford et al. |
| 2014/0281207 A1 | 9/2014 | Mandava et al. |
| 2014/0293725 A1 | 10/2014 | Best et al. |
| 2014/0321226 A1 | 10/2014 | Pyeon |
| 2015/0016203 A1 | 1/2015 | Sriramagiri et al. |
| 2015/0036445 A1 | 2/2015 | Yoshida et al. |
| 2015/0049566 A1 | 2/2015 | Lee et al. |
| 2015/0049567 A1 | 2/2015 | Chi |
| 2015/0055420 A1 | 2/2015 | Bell et al. |
| 2015/0078112 A1 | 3/2015 | Huang |
| 2015/0085564 A1 | 3/2015 | Yoon et al. |
| 2015/0089326 A1 | 3/2015 | Joo et al. |
| 2015/0092508 A1 | 4/2015 | Bains |
| 2015/0109871 A1 | 4/2015 | Bains et al. |
| 2015/0120999 A1 | 4/2015 | Kim et al. |
| 2015/0134897 A1 | 5/2015 | Sriramagiri et al. |
| 2015/0155025 A1 | 6/2015 | Lee et al. |
| 2015/0162064 A1 | 6/2015 | Oh et al. |
| 2015/0162067 A1 | 6/2015 | Kim et al. |
| 2015/0170728 A1 | 6/2015 | Jung et al. |
| 2015/0170733 A1* | 6/2015 | Lee .......................... G11C 7/02 |
| | | 365/222 |
| 2015/0199126 A1 | 7/2015 | Jayasena et al. |
| 2015/0206572 A1 | 7/2015 | Lim et al. |
| 2015/0213872 A1 | 7/2015 | Mazumder et al. |
| 2015/0243339 A1 | 8/2015 | Bell et al. |
| 2015/0255140 A1 | 9/2015 | Song |
| 2015/0279441 A1 | 10/2015 | Greenberg et al. |
| 2015/0279442 A1 | 10/2015 | Hwang |
| 2015/0294711 A1 | 10/2015 | Gaither et al. |
| 2015/0340077 A1 | 11/2015 | Akamatsu |
| 2015/0356048 A1 | 12/2015 | King |
| 2015/0380073 A1 | 12/2015 | Joo et al. |
| 2016/0019940 A1 | 1/2016 | Jang et al. |
| 2016/0027498 A1 | 1/2016 | Ware et al. |
| 2016/0027531 A1 | 1/2016 | Jones et al. |
| 2016/0027532 A1 | 1/2016 | Kim |
| 2016/0042782 A1 | 2/2016 | Narui et al. |
| 2016/0070483 A1 | 3/2016 | Yoon et al. |
| 2016/0078846 A1 | 3/2016 | Liu et al. |
| 2016/0078911 A1 | 3/2016 | Fujiwara et al. |
| 2016/0085466 A1 | 3/2016 | Benedict et al. |
| 2016/0086649 A1 | 3/2016 | Hong et al. |
| 2016/0093402 A1 | 3/2016 | Kitagawa et al. |
| 2016/0125931 A1 | 5/2016 | Doo et al. |
| 2016/0133314 A1 | 5/2016 | Hwang et al. |
| 2016/0155491 A1 | 6/2016 | Roberts et al. |
| 2016/0180917 A1 | 6/2016 | Chishti et al. |
| 2016/0180921 A1 | 6/2016 | Jeong |
| 2016/0196863 A1 | 7/2016 | Shin et al. |
| 2016/0202926 A1 | 7/2016 | Benedict |
| 2016/0224262 A1 | 8/2016 | Mandava et al. |
| 2016/0225433 A1 | 8/2016 | Bains et al. |
| 2016/0239663 A1 | 8/2016 | Healy et al. |
| 2016/0336060 A1 | 11/2016 | Shin |
| 2016/0343423 A1 | 11/2016 | Shido |
| 2016/0352518 A1 | 12/2016 | Ford et al. |
| 2017/0011792 A1 | 1/2017 | Oh et al. |
| 2017/0047110 A1 | 2/2017 | Kang et al. |
| 2017/0052722 A1 | 2/2017 | Ware et al. |
| 2017/0062038 A1 | 3/2017 | Doo et al. |
| 2017/0076779 A1 | 3/2017 | Bains et al. |
| 2017/0092350 A1 | 3/2017 | Halbert et al. |
| 2017/0110177 A1 | 4/2017 | Lee et al. |
| 2017/0111792 A1 | 4/2017 | Correia Fernandes et al. |
| 2017/0117030 A1 | 4/2017 | Fisch et al. |
| 2017/0133085 A1 | 5/2017 | Kim et al. |
| 2017/0133108 A1 | 5/2017 | Lee et al. |
| 2017/0140807 A1 | 5/2017 | Sun et al. |
| 2017/0140810 A1 | 5/2017 | Choi et al. |
| 2017/0140811 A1 | 5/2017 | Joo |
| 2017/0146598 A1 | 5/2017 | Kim et al. |
| 2017/0148504 A1* | 5/2017 | Saifuddin ........... G11C 11/4087 |
| 2017/0177246 A1 | 6/2017 | Miller et al. |
| 2017/0177505 A1 | 6/2017 | Basak et al. |
| 2017/0186481 A1 | 6/2017 | Oh et al. |
| 2017/0213586 A1 | 7/2017 | Kang et al. |
| 2017/0221546 A1 | 8/2017 | Loh et al. |
| 2017/0263305 A1 | 9/2017 | Cho |
| 2017/0264428 A1 | 9/2017 | Seger, II |
| 2017/0269861 A1 | 9/2017 | Lu et al. |
| 2017/0287547 A1 | 10/2017 | Ito et al. |
| 2017/0323675 A1 | 11/2017 | Jones et al. |
| 2017/0345482 A1 | 11/2017 | Balakrishnan |
| 2017/0352404 A1 | 12/2017 | Lee et al. |
| 2018/0005690 A1 | 1/2018 | Morgan et al. |
| 2018/0025770 A1 | 1/2018 | Ito et al. |
| 2018/0025772 A1 | 1/2018 | Lee et al. |
| 2018/0025773 A1 | 1/2018 | Bains et al. |
| 2018/0033479 A1 | 2/2018 | Lea et al. |
| 2018/0047110 A1 | 2/2018 | Blackman et al. |
| 2018/0061476 A1 | 3/2018 | Kim |
| 2018/0061483 A1 | 3/2018 | Morgan |
| 2018/0061485 A1 | 3/2018 | Joo |
| 2018/0075927 A1 | 3/2018 | Jeong et al. |
| 2018/0082736 A1 | 3/2018 | Jung |
| 2018/0082737 A1 | 3/2018 | Lee |
| 2018/0096719 A1 | 4/2018 | Tomishima et al. |
| 2018/0102776 A1 | 4/2018 | Chandrasekar et al. |
| 2018/0107417 A1 | 4/2018 | Shechter et al. |
| 2018/0108401 A1 | 4/2018 | Choi et al. |
| 2018/0114561 A1 | 4/2018 | Fisch et al. |
| 2018/0114565 A1 | 4/2018 | Lee |
| 2018/0122454 A1 | 5/2018 | Lee et al. |
| 2018/0130506 A1 | 5/2018 | Kang et al. |
| 2018/0137005 A1 | 5/2018 | Wu et al. |
| 2018/0158504 A1 | 6/2018 | Akamatsu |
| 2018/0158507 A1 | 6/2018 | Bang |
| 2018/0182445 A1 | 6/2018 | Lee et al. |
| 2018/0190340 A1 | 7/2018 | Kim et al. |
| 2018/0218767 A1 | 8/2018 | Wolff |
| 2018/0226119 A1 | 8/2018 | Kim et al. |
| 2018/0233197 A1 | 8/2018 | Laurent |
| 2018/0240511 A1 | 8/2018 | Yoshida et al. |
| 2018/0247876 A1 | 8/2018 | Kim et al. |
| 2018/0254078 A1 | 9/2018 | We et al. |
| 2018/0261268 A1 | 9/2018 | Hyun et al. |
| 2018/0276150 A1 | 9/2018 | Eckert et al. |
| 2018/0285007 A1 | 10/2018 | Franklin et al. |
| 2018/0294028 A1 | 10/2018 | Lee et al. |

(56) References Cited

U.S. PATENT DOCUMENTS

| | | |
|---|---|---|
| 2018/0308539 A1 | 10/2018 | Ito et al. |
| 2018/0341553 A1 | 11/2018 | Koudele et al. |
| 2018/0342282 A1 | 11/2018 | Morgan |
| 2019/0013059 A1 | 1/2019 | Akamatsu |
| 2019/0043558 A1 | 2/2019 | Suh et al. |
| 2019/0051344 A1 | 2/2019 | Bell et al. |
| 2019/0051347 A1 | 2/2019 | Lee |
| 2019/0065087 A1 | 2/2019 | Li et al. |
| 2019/0066759 A1 | 2/2019 | Nale |
| 2019/0066766 A1 | 2/2019 | Lee |
| 2019/0088315 A1 | 3/2019 | Saenz et al. |
| 2019/0088316 A1 | 3/2019 | Inuzuka et al. |
| 2019/0103147 A1 | 4/2019 | Jones et al. |
| 2019/0115069 A1 | 4/2019 | Lai |
| 2019/0122722 A1 | 4/2019 | Yamada et al. |
| 2019/0122723 A1 | 4/2019 | Ito et al. |
| 2019/0129651 A1 | 5/2019 | Wuu et al. |
| 2019/0130960 A1 | 5/2019 | Kim |
| 2019/0130961 A1 | 5/2019 | Bell et al. |
| 2019/0139599 A1 | 5/2019 | Ito et al. |
| 2019/0147964 A1 | 5/2019 | Yun et al. |
| 2019/0161341 A1 | 5/2019 | Howe |
| 2019/0190341 A1 | 6/2019 | Beisele et al. |
| 2019/0196730 A1 | 6/2019 | Imran |
| 2019/0198078 A1 | 6/2019 | Hoang et al. |
| 2019/0198099 A1 | 6/2019 | Mirichigni et al. |
| 2019/0205253 A1 | 7/2019 | Roberts |
| 2019/0228810 A1 | 7/2019 | Jones et al. |
| 2019/0228815 A1 | 7/2019 | Morohashi et al. |
| 2019/0237131 A1 | 8/2019 | Ito |
| 2019/0237132 A1 | 8/2019 | Morohashi |
| 2019/0252020 A1 | 8/2019 | Rios et al. |
| 2019/0267077 A1 | 8/2019 | Ito et al. |
| 2019/0279706 A1 | 9/2019 | Kim |
| 2019/0294348 A1 | 9/2019 | Ware et al. |
| 2019/0333573 A1 | 10/2019 | Shin et al. |
| 2019/0347019 A1 | 11/2019 | Shin et al. |
| 2019/0348100 A1 | 11/2019 | Smith et al. |
| 2019/0348102 A1 | 11/2019 | Smith et al. |
| 2019/0348103 A1 | 11/2019 | Jeong et al. |
| 2019/0362774 A1 | 11/2019 | Kuramori et al. |
| 2019/0371390 A1 | 12/2019 | Ito |
| 2019/0385661 A1 | 12/2019 | Koo et al. |
| 2019/0385667 A1 | 12/2019 | Morohashi et al. |
| 2019/0385668 A1 | 12/2019 | Fujioka et al. |
| 2019/0385670 A1 | 12/2019 | Notani et al. |
| 2019/0386557 A1 | 12/2019 | Wang et al. |
| 2019/0391760 A1 | 12/2019 | Miura et al. |
| 2019/0392886 A1 | 12/2019 | Cox et al. |
| 2020/0005857 A1 | 1/2020 | Ito et al. |
| 2020/0051616 A1 | 2/2020 | Cho |
| 2020/0075086 A1 | 3/2020 | Hou et al. |
| 2020/0082873 A1 | 3/2020 | Wolff |
| 2020/0126611 A1 | 4/2020 | Riho et al. |
| 2020/0135263 A1* | 4/2020 | Brown ............... G11C 11/40615 |
| 2020/0143871 A1 | 5/2020 | Kim et al. |
| 2020/0176050 A1 | 6/2020 | Ito et al. |
| 2020/0185026 A1 | 6/2020 | Yun et al. |
| 2020/0194050 A1 | 6/2020 | Akamatsu |
| 2020/0194056 A1 | 6/2020 | Sakurai et al. |
| 2020/0202921 A1 | 6/2020 | Morohashi et al. |
| 2020/0210278 A1 | 7/2020 | Rooney et al. |
| 2020/0211632 A1 | 7/2020 | Noguchi |
| 2020/0211633 A1 | 7/2020 | Okuma |
| 2020/0211634 A1 | 7/2020 | Ishikawa et al. |
| 2020/0219555 A1* | 7/2020 | Rehmeyer ......... G11C 11/40618 |
| 2020/0219556 A1 | 7/2020 | Ishikawa et al. |
| 2020/0265888 A1 | 8/2020 | Ito et al. |
| 2020/0273517 A1 | 8/2020 | Yamamoto |
| 2020/0273518 A1 | 8/2020 | Raad et al. |
| 2020/0279599 A1 | 9/2020 | Ware et al. |
| 2020/0294569 A1 | 9/2020 | Wu et al. |
| 2020/0294576 A1 | 9/2020 | Brown et al. |
| 2020/0321049 A1 | 10/2020 | Meier et al. |
| 2020/0381040 A1 | 12/2020 | Penney et al. |
| 2020/0388324 A1 | 12/2020 | Rehmeyer et al. |
| 2020/0388325 A1 | 12/2020 | Cowles et al. |
| 2020/0395063 A1 | 12/2020 | Rehmeyer |
| 2020/0402568 A1 | 12/2020 | He et al. |
| 2021/0057021 A1* | 2/2021 | Wu ..................... G11C 11/4087 |
| 2021/0057022 A1 | 2/2021 | Jenkinson et al. |
| 2021/0109577 A1 | 4/2021 | Mandava et al. |
| 2021/0118491 A1 | 4/2021 | Li et al. |
| 2021/0166752 A1 | 6/2021 | Noguchi |
| 2021/0183433 A1 | 6/2021 | Jenkinson et al. |
| 2021/0183435 A1 | 6/2021 | Meier et al. |
| 2021/0223852 A1 | 7/2021 | Chang et al. |
| 2021/0225431 A1 | 7/2021 | Rehmeyer et al. |
| 2021/0304813 A1 | 9/2021 | Cowles et al. |
| 2021/0335411 A1 | 10/2021 | Wu et al. |
| 2021/0350844 A1 | 11/2021 | Morohashi et al. |
| 2021/0406170 A1 | 12/2021 | Jung et al. |
| 2022/0051716 A1* | 2/2022 | Ayyapureddi ...... G06F 13/1636 |
| 2022/0059153 A1 | 2/2022 | Zhang et al. |
| 2022/0059158 A1* | 2/2022 | Wu ................... G11C 11/40603 |
| 2022/0068361 A1 | 3/2022 | Du et al. |
| 2022/0091784 A1 | 3/2022 | Brandl |
| 2022/0093165 A1 | 3/2022 | Mitsubori et al. |
| 2022/0165328 A1 | 5/2022 | Ishikawa et al. |
| 2022/0189537 A1 | 6/2022 | Kim |
| 2022/0189539 A1 | 6/2022 | Li et al. |
| 2022/0199144 A1 | 6/2022 | Roberts |
| 2022/0199150 A1 | 6/2022 | Song et al. |
| 2022/0270670 A1 | 8/2022 | Wu et al. |
| 2022/0270672 A1* | 8/2022 | Kim .................. G11C 11/40603 |
| 2023/0105151 A1 | 4/2023 | Brown et al. |
| 2023/0168818 A1* | 6/2023 | You .......................... G11C 7/02 |
| 2023/0298654 A1 | 9/2023 | Du et al. |
| 2023/0352075 A1 | 11/2023 | Suzuki |
| 2023/0352076 A1* | 11/2023 | He ................... G11C 11/40603 |
| 2024/0038288 A1* | 2/2024 | Kim .................. G11C 11/40615 |
| 2024/0062798 A1 | 2/2024 | Cowles et al. |
| 2024/0071460 A1 | 2/2024 | Noguchi |
| 2024/0339146 A1* | 10/2024 | Kim .................. G11C 11/40611 |
| 2025/0006243 A1 | 1/2025 | He et al. |
| 2025/0111045 A1 | 4/2025 | Lee et al. |
| 2025/0111872 A1 | 4/2025 | Choi et al. |
| 2025/0173255 A1 | 5/2025 | Rooney |

FOREIGN PATENT DOCUMENTS

| | | |
|---|---|---|
| CN | 1879173 A | 12/2006 |
| CN | 101026003 A | 8/2007 |
| CN | 101038785 A | 9/2007 |
| CN | 101047025 A | 10/2007 |
| CN | 101067972 A | 11/2007 |
| CN | 101075477 A | 11/2007 |
| CN | 101091221 A | 12/2007 |
| CN | 101211653 A | 7/2008 |
| CN | 101217060 A | 7/2008 |
| CN | 101243450 A | 8/2008 |
| CN | 102301423 A | 12/2011 |
| CN | 102663155 A | 9/2012 |
| CN | 102737706 A | 10/2012 |
| CN | 102931187 A | 2/2013 |
| CN | 104350546 A | 2/2015 |
| CN | 104733035 A | 6/2015 |
| CN | 104737234 A | 6/2015 |
| CN | 104781885 A | 7/2015 |
| CN | 104981874 A | 10/2015 |
| CN | 105378847 A | 3/2016 |
| CN | 105529047 A | 4/2016 |
| CN | 106158005 A | 11/2016 |
| CN | 106710621 A | 5/2017 |
| CN | 106816169 A | 6/2017 |
| CN | 107017016 A | 8/2017 |
| CN | 107025927 A | 8/2017 |
| CN | 107301874 A | 10/2017 |
| CN | 107871516 A | 4/2018 |
| CN | 107919150 A | 4/2018 |
| CN | 108154895 A | 6/2018 |
| CN | 108242248 A | 7/2018 |
| CN | 108806740 A | 11/2018 |
| CN | 109727624 A | 5/2019 |

(56) References Cited

FOREIGN PATENT DOCUMENTS

| | | | |
|----|----|----|----|
| CN | 109949844 | A | 6/2019 |
| CN | 110032897 | A | 7/2019 |
| CN | 110520929 | A | 11/2019 |
| CN | 110678925 | A | 1/2020 |
| CN | 110827884 | A | 2/2020 |
| CN | 111052243 | A | 4/2020 |
| CN | 111247586 | A | 6/2020 |
| CN | 111354393 | A | 6/2020 |
| CN | 111383682 | A | 7/2020 |
| CN | 114121076 | A | 3/2022 |
| JP | S6282887 | A | 4/1987 |
| JP | 2003085054 | A | 3/2003 |
| JP | 2005-216429 | A | 8/2005 |
| JP | 2011-258259 | A | 12/2011 |
| JP | 4911510 | B2 | 1/2012 |
| JP | 2013-004158 | A | 1/2013 |
| JP | 2014238903 | A | 12/2014 |
| JP | 6281030 | B1 | 1/2018 |
| KR | 20030063947 | A | 7/2003 |
| KR | 20070109104 | A | 11/2007 |
| KR | 20160134411 | A | 11/2016 |
| KR | 20170053373 | A | 5/2017 |
| KR | 20170093053 | A | 8/2017 |
| KR | 20180011642 | A | 2/2018 |
| KR | 20180081989 | A | 7/2018 |
| KR | 20180101647 | A | 9/2018 |
| KR | 20190046572 | A | 5/2019 |
| TW | 201801079 | A | 1/2018 |
| WO | 2014120477 | | 8/2014 |
| WO | 2015030991 | A1 | 3/2015 |
| WO | 2017171927 | A1 | 10/2017 |
| WO | 2019079157 | A1 | 4/2019 |
| WO | 2019083884 | A1 | 5/2019 |
| WO | 2019222960 | A1 | 11/2019 |
| WO | 2020010010 | A1 | 1/2020 |
| WO | 2020117686 | A1 | 6/2020 |
| WO | 2020247163 | A1 | 12/2020 |
| WO | 2020247639 | A1 | 12/2020 |

OTHER PUBLICATIONS

Anonymous: "Frequency—Wikipedia", Dec. 17, 2018, retrieved from URL: https://en.wikipedia.org/w/index.php?title=Frequency &oldid=874192848 pp. All.

Kim , et al. "Flipping Bits in MemoryWithout Accessing Them: An Experimental Study of DRAM Disturbance Errors", IEEE, Jun. 2014, pp. all.

Park, Kyungbae et al., Experiments and Root Cause Analysis for Active-Precharge Hammering Fault in DDR3 SDRAM Under 3 X NM Technology; Microelectronics Reliability: An Internet. Journal and World Abstracting Service; vol. 57, Dec. 23, 2015; pp. 39-46.

* cited by examiner

APPARATUSES AND METHODS FOR CONTROLLER SIGNALING OF REFRESH OPERATIONS

CROSS REFERENCE TO RELATED APPLICATION(S)

This application claims the benefit under 35 U.S.C. § 119 of the earlier filing date of U.S. Provisional Application Ser. No. 63/603,210 filed Nov. 28, 2023, the entire contents of which is hereby incorporated by reference in its entirety for any purpose.

BACKGROUND

Information may be stored on memory cells of a memory device. The memory cells may be organized at the intersection of word lines (rows) and bit lines (columns). Information in the memory cells may decay over time. For example, the information may be stored as a charge on a capacitor which may decay over time. The memory device may perform refresh operations to restore the information and prevent information from being lost.

Certain patterns of access may cause an increased rate of information decay in nearby memory cells (e.g., the memory cells along nearby word lines). Memory devices may use various schemes to identify these access patterns so that additional targeted refresh operations may be performed. A controller may signal the memory to perform refresh operations, some of which may be sequential operations to refresh memory cells decaying at an expected rate and some of which may be targeted refresh operations. There may be a need to give the controller more precise control over the types of refresh operation performed.

DETAILED DESCRIPTION

Figure 1:
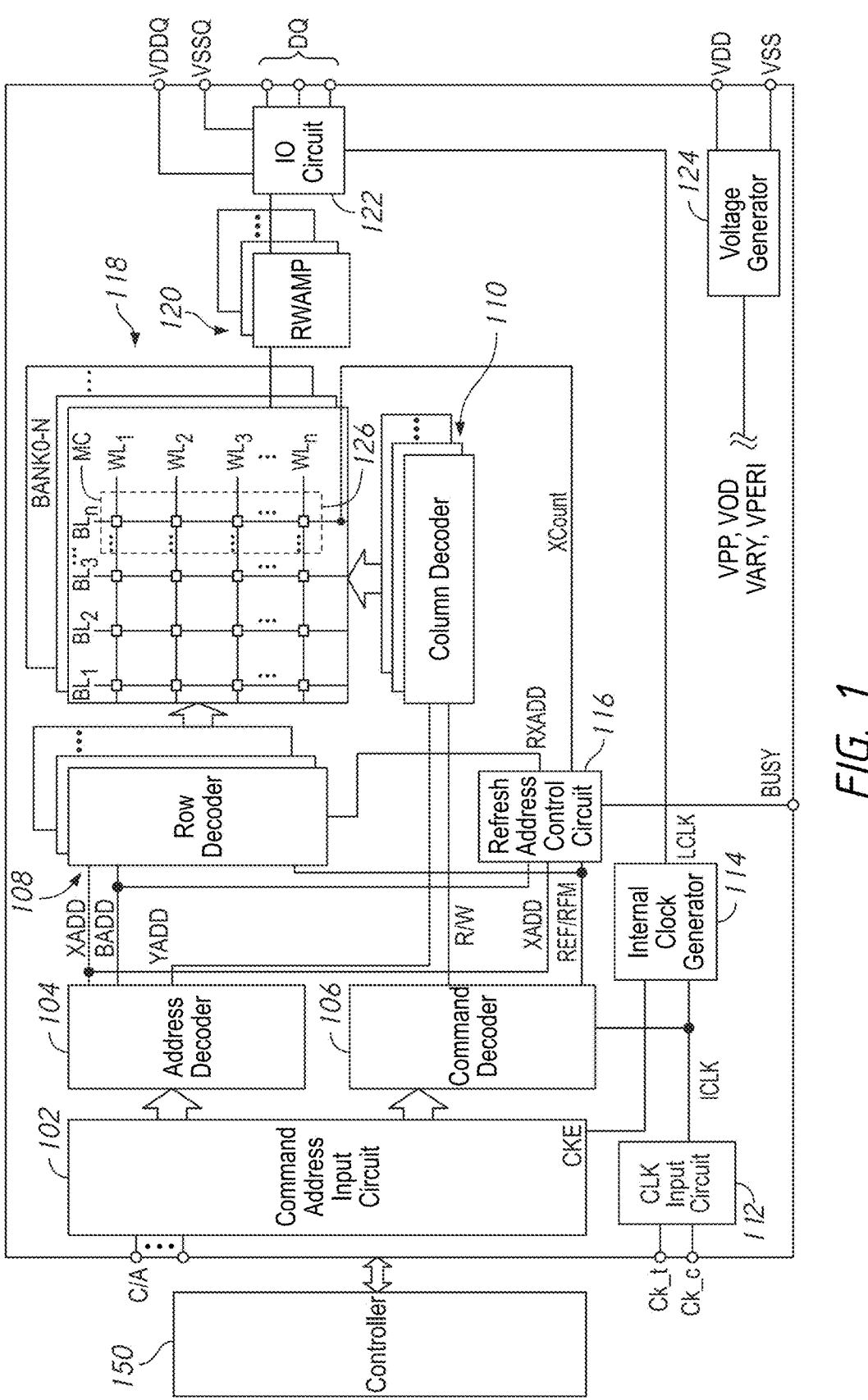
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. During an example access operation a word line may be activated based on a row address and then selected memory cells along that active word line may have their information read or written to based on which bit lines are accessed, which may be based on a column address. The memory array may be refreshed on a row by row basis (e.g., as part of an auto-refresh and/or self-refresh mode) where the memory cells along each row are refreshed periodically. Such refresh operations may be referred to as sequential refresh operations, as the memory may use some sequence logic (e.g., a counter) to generate the refresh addresses. The speed at which the rows are refreshed (e.g., the maximum time any given row will go between refreshes) may be determined based on an expected rate of information decay.

Various patterns of access to a row (an aggressor row) may cause an increased rate of information decay in nearby memory cells (e.g., along victim rows). For example, a 'row hammer' may involve repeated accesses to the aggressor row which may increase a rate of decay in adjacent rows (and/or in rows which are further away). Accordingly, it may be important to track a number of accesses to each row to determine if they are aggressors, such that the victim rows can be identified and refreshed as part of a targeted refresh operation. For example, each word line may have an associated count value which is used to determine how many times that word line has been accessed.

Conventional memory systems may be set up such that both the memory and the controller are capable of determining when to perform targeted refresh operations. For example, the memory may 'steal' every Nth sequential refresh operation to perform targeted refresh operations instead. The controller may monitor access patterns and issue refresh management (RFM) commands based on those access patterns. However, this may be inefficient and lead to situations where the memory is over refreshed, taking time which could have been used for sequential refresh operations which in turn may increase the downtime of the device. Accordingly, there is a need to give the controller more control over how sequential and targeted refresh operations are scheduled.

The present disclosure is drawn to apparatuses, systems, and methods for controller signaling of refresh operations. A controller may issue a refresh command or a refresh management command. Responsive to the refresh command, the memory performs a sequential refresh command. Responsive to the refresh management command, the memory performs a targeted refresh operation (based on an aggressor address identified by the memory). The controller may include targeted refresh logic which tracks access patterns to the memory and issues the RFM command based on those accesses. For example, the controller may count accesses on a bank by bank basis and issue an RFM to that bank when the access count crosses a threshold. This may allow the controller to exert greater control over when each type of refresh operation is performed.

The memory may, in some embodiments, exclusively perform sequential refresh operations responsive to the refresh command and targeted refresh operations responsive to the RFM command. For example, responsive to a refresh command the memory may perform one or more sequential refresh operations, but not any targeted refresh operations. Responsive to the RFM command, the memory may perform one or more targeted refresh operations, but not any sequential refresh operations.

FIG. 1 is a block diagram of a semiconductor device according to at least one embodiment of the disclosure. The semiconductor device 100 may be a semiconductor memory device, such as a DRAM device integrated on a single semiconductor chip. The device 100 may be operated by a controller, such as the controller 150. The controller may be any device (or collection of devices) which stores information on the memory. For example, the controller 150 may be a processor. In some embodiments, the controller 150 and memory 100 may be packaged together on a single integrated circuit. In some embodiments, the controller 150 and memory 100 may be separate. In some embodiments, the controller 150 may operate multiple memory devices 100.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL (rows), a plurality of bit lines BL (columns), and a plurality of memory cells MC arranged at intersections of the plurality of word lines WL and the plurality of bit lines BL.

The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL.

The semiconductor device 100 may employ a plurality of external terminals coupled to the controller 150. The external terminals include command and address (C/A) terminals coupled to the controller 150 along a command and address bus to receive commands and addresses. Other external terminals include clock terminals to receive clocks clock signals CK and/CK along a clock bus, data terminals DQ to send and receive data along a data bus, and power supply terminals to receive power supply potentials such as VDD, VSS, VDDQ, and VSSQ.

The clock terminals are supplied by the controller 150 with external clocks CK and/CK that are provided to an input circuit 112. The external clocks may be complementary. The input circuit 112 generates an internal clock ICLK based on the CK and/CK clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses by the controller 150. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

As part of an example read operation, the device 100 may a read command along with memory addresses which indicate where the read command should be performed. Responsive to the read command, data is read out from the memory cells of the bank specified by BADD at the intersection of the row specified by XADD and the columns specified by YADD. The read command is received by the command decoder 106, which provides internal commands so that read data from the memory array 118 is provided to the read/write amplifiers 120. The read data is output to the controller 150 from the data terminals DQ via the input/output circuit 122.

As part of an example write operation, the device 100 may receive a write command along with data to be written to the array and memory addresses which indicate where the write operation should be performed. Responsive to the write command, the data is written to the bank specified by BADD at the memory cells at the intersection of the word line specified by XADD and the columns specified by YADD. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 to the read/write amplifiers 120, and by the read/write amplifiers 120 to the memory array 118 to be written into the memory cells MC specified by the addresses.

The device 100 may also receive commands causing it to carry out refresh operations. For example, a controller 150 of the memory may put the device 100 into an auto-refresh mode where refresh operations are directed by the controller 150. As part of the auto-refresh mode, the controller 150 may supply different types of refresh command (e.g., along the C/A bus to the C/A terminals of the memory). A first type of refresh command (e.g., the refresh command REF) may be used to manage sequential refresh operations. A second type of refresh command (e.g., a refresh management command RFM) may be used to manage targeted refresh operations.

The refresh signals REF and RFM are supplied to the refresh address control circuit 116. The refresh address control circuit 116 supplies one or more refresh row address RXADD to the row decoder 108, which refreshes one or more wordlines WL identified by the refresh row address RXADD. As described in more detail herein, whether the command REF or RFM is used may determine a type of refresh operation performed by the refresh control circuit 116. A first type of refresh operation (e.g., a sequential refresh operation) may be performed responsive to REF, while a second type of refresh operation (e.g., a targeted refresh operation) may be performed responsive to RFM. In some embodiments, the controller 150 may issue both types of refresh command REF and RFM together and the memory 100 may perform a mix of sequential and targeted refresh operation. Which type(s) of refresh operation are performed may determine details of how the refresh control circuit 116 performs the refresh, such as how it generates the refresh address RXADD, how many word lines are associated with each address RXADD, how many refresh addresses are issued, or combinations thereof.

Responsive to the refresh command REF, the refresh control circuit 116 may perform a sequential refresh operation by issuing one or more sequential refresh addresses as RXADD. The sequential refresh addresses may be generated based on a sequence of addresses. For example, after issuing a sequential refresh address, a counter circuit may increment the address to generate the next address in the sequence. The refresh address control circuit 116 may cycle through the sequence of sequential addresses at a rate determined by REF. In some embodiments, the sequence of sequential addresses may include all the addresses in the memory bank 118. In some embodiments, the controller 150 may issue the signal REF with a frequency such that most or all of the addresses in the memory bank 118 are refreshed within a certain period (e.g., such that there is a maximum specified time between two consecutive sequential refreshes of a given word line), which may be based on an expected rate at which information in the memory cells MC decays.

Responsive to the targeted refresh command RFM, the refresh control circuit 116 may perform a targeted refresh operation. The refresh control circuit 116 identifies addresses as targets for targeted refresh operations. These addresses may generally be referred to as aggressors, although different embodiments may use different criteria for identifying these addresses. The refresh control circuit 116 may include a register which stores identified aggressors. As part of a targeted refresh operation, one or more refresh addresses are generated based on a selected aggressor. For example, in some embodiments, the refresh addresses may represent word lines which are physically adjacent to the word line associated with the identified aggressor address (e.g., RXADD=XADD+/−1). Other relationships may be used in other example embodiments. For example word lines which are further away (e.g., RXADD=XADD+/−2, +/−3, etc.) may be refreshed.

The memory device 100 may use one or more systems to determine which address(es) are aggressors. For the sake of example, the device 100 is described with respect to a particular system where row access counts are stored in the memory array. However, other types of aggressor detection may be used instead of or in addition to the aggressor detection system described herein. For example, other types of aggressor detection may be based on the row addresses XADD received from the controller 150 rather than count values stored in the array 118.

In the example embodiment of FIG. 1, some of the memory cells of the array 118 may be set aside for use in tracking aggressor rows. The memory cells 126 which are set aside for such a purpose may generally be referred to as counter memory cells 126. The counter memory cells may store count values XCount, each of which is associated with one of the word lines. For example, each count value XCount may be stored in counter memory cells 126 along the word line that the count value is associated with. The count value XCount may be stored as a binary number, with each bit stored in a memory cell along the word line. For the sake of clarity, a single bit line of counter memory cells 126 is shown in FIG. 1. The number of counter memory cells along each word line may be based on a number of bits of the count value XCount. In some embodiments, extra counter memory cells (e.g., more than the length of the number XCount) may be used, for example to store error correction information for the count value XCount.

The counter memory cells 126 may be referred to as such due to their use (storing the count values) and in some embodiments may be structurally similar to, or identical to, the other memory cells of the array. In some embodiments, the counter memory cells 126 may be grouped together (e.g., at the end of the word line). Other distributions of the counter memory cells 126 along the word line may be used in other example embodiments. In some embodiments, the counter memory cells 126 may not be directly accessible by external devices such as controllers (e.g., to prevent the count values from being overwritten). In other words, the bit lines associated with the counter memory cells 126 may not be accessed by a normal column address.

The count values XCount may be used to determine if the associated word line is an aggressor or not. For example, each time the word line is accessed, the count value XCount may be read out to the refresh control circuit which may update the count, compare the updated count to a threshold and write the updated count back to the counter memory cells 126. For example the count may be updated by being incremented. If the updated count crosses the threshold, then the row address XADD associated with the word line (and the count XCount) may be stored as an aggressor and the count value may be updated again by being reset to an initial value (e.g., 0). In some embodiments, the threshold may represent a maximum value of the count and the count may cross the threshold by 'rolling over' back to the initial value (e.g., from 11111111 to 00000000).

In some embodiments, the memory device 100 may also have a self-refresh mode, where the memory device 100 performs its own refreshes for example, to maintain the state of data in the array while in an idle state. In some embodiments, when entered in the self-refresh mode, the refresh control circuit 116 may generate a refresh signal with periodic timing, and perform refresh operations responsive to the refresh signal. In some embodiments, only sequential refreshes may be performed while the device is in the self-refresh mode (e.g., since accesses are not being performed and rows will not be hammered). In some embodiments, a mix of sequential and targeted refresh operations may be performed. For example, if there are aggressor addresses in the aggressor queue, the refresh control circuit may perform a mix of targeted and sequential refresh operations during the self-refresh mode until the queue is empty.

The power supply terminals are supplied with power supply potentials VDD and VSS. The power supply potentials VDD and VSS are supplied to an internal voltage generator circuit 124. The internal voltage generator circuit 124 generates various internal potentials VPP, VARY, VPERI, and the like based on the power supply potentials VDD and VSS supplied to the power supply terminals. The internal potential VPP is mainly used in the row decoder 108, the internal potentials VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
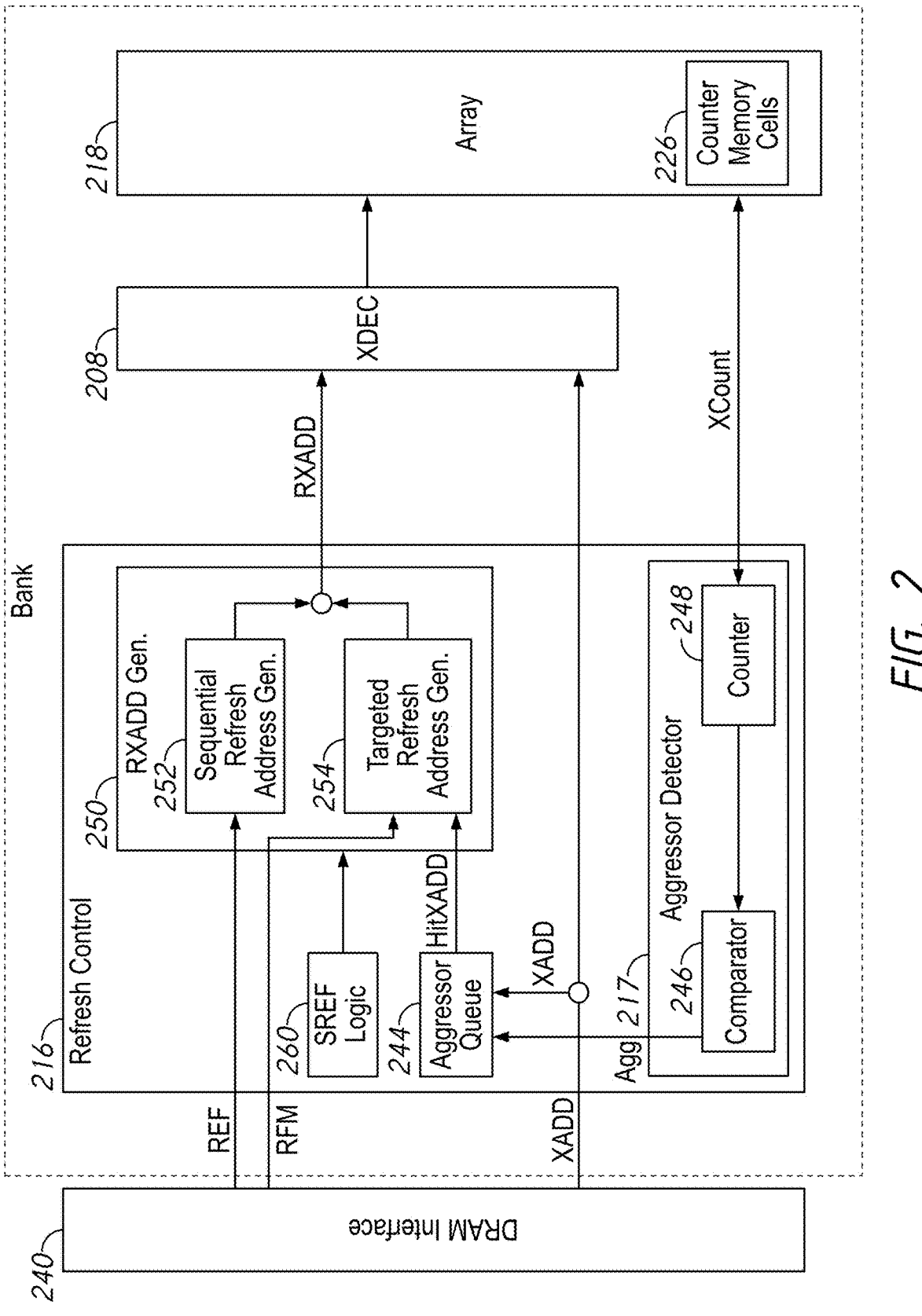
FIG. 2 is a block diagram of a refresh control circuit according to an embodiment of the present disclosure.

FIG. 2 is a block diagram of a refresh control circuit according to an embodiment of the present disclosure. FIG. 2 may show an example layout which may implement a portion of a memory device 200, such as the memory device 100 of FIG. 1. For example, the memory array 218 may implement the memory array 118 of FIG. 1, the row decoder 208 may implement the row decoder 108 of FIG. 1, the refresh control circuit 216 may implement the refresh control circuit 116 of FIG. 1 and so forth.

Certain internal components and signals of the refresh address control circuit 216 are shown to illustrate the operation of the refresh address control circuit 216. For example, the refresh control circuit 216 includes an aggressor address register or aggressor address queue 244 which stores identified aggressor addresses, a refresh address generator 250 which generates the refresh address RXADD and an aggressor detector circuit 217 which determines if an address XADD is an aggressor address HitXADD. The refresh control circuit 216 also includes self refresh (SREF) logic circuits 260 which may control refresh operations in a self-refresh mode.

The dotted line around the refresh address control circuit 216, the row decoder 208, and the memory array 218 is shown to represent that in certain embodiments, each of the components within the dotted line may correspond to a particular bank of memory, and that these components may be repeated for each of the banks of memory. In some embodiments, the components shown within the dotted line may be associated with each of the memory banks. Thus, there may be multiple refresh address control circuits 216 each with their own aggressor addresses in their own aggressor queues 244. For the sake of brevity, components for only a single bank will be described.

A DRAM interface 240 may provide one or more signals to an address refresh control circuit 216 and row decoder 208 which in turn (along with a column decoder, not shown) may perform access operation on a memory array 218. The DRAM interface 240 represents various components of the memory which send, receive, and/or decode signals to/from the controller as part of access operations. For example the DRAM interface 240 may represent a command/address input circuit (e.g., 102 of FIG. 1), address decoder (e.g., 104 of FIG. 1) and command decoder (e.g., 106 of FIG. 1). During an example access operation, the DRAM interface 240 provides a row address XADD, as well as other signals not shown in FIG. 2, such as an activation signal ACT and pre-charge signal Pre. The DRAM interface 240 also provides commands such as the refresh command REF and refresh management command RFM received from a controller (e.g., 150 of FIG. 1).

Responsive to a refresh command REF, the memory performs one or more sequential refresh operations. As part of the sequential refresh operation, the refresh address generator circuit 250 provides one or more refresh addresses RXADD which are generated by the sequential refresh address circuit 252. The sequential refresh address generator circuit may use logic to generate each new refresh address as part of a sequence. Each new sequential refresh address may be based on a previous sequential refresh address. In other words, sequence logic may be used to update the previous refresh address provided by the sequential address generator circuit 252 to generate the next refresh address which will be provided by the sequential address generator circuit 252. For example, the sequential refresh address generator circuit 252 may include a counter circuit which updates a value of the previous sequential refresh address to generate a new sequential refresh address (e.g., RXADD(i)=RXADD(i−1)+1). Other logic may be used to generate the sequence of sequential refresh addresses in other example embodiments.

Responsive to a refresh management command RFM, the refresh control circuit 216 may perform one or more targeted refresh operations. As part of the targeted refresh operations, a targeted refresh address generator circuit 254 of the refresh address generator 250 provides one or more targeted refresh addresses as the refresh address RXADD. A targeted refresh address generator circuit 254 of the refresh address generator 250 generates the targeted refresh addresses based on an identified aggressor address HitXADD stored in the aggressor queue 244. For example, the targeted refresh address generator 254 may generate two targeted refresh addresses based on the aggressor address HitXADD which represent the word lines in the array 218 which are adjacent to HitXADD (e.g., RXADD=HitXADD+/−1). Other numbers of address per aggressor and other methods of generating the refresh address based on the aggressor may be used in other example embodiments.

Responsive to the refresh address RXADD (whether sequential or targeted) and the signals REF or RFM, the row decoder 208 refreshes the memory cells along the word line(s) indicated by the refresh address. In some embodiments, the sequential refresh address may indicate a different number of word lines than the targeted refresh address. For example, the sequential refresh address may be associated with more word lines than the targeted refresh address. In some embodiments, the sequential refresh address may be associated with multiple word lines while the targeted refresh address is associated with a single word line.

The refresh control circuit 216 may include an optional self-refresh logic circuit 260. The controller may enter the memory into a self-refresh mode (e.g., by sending a self-refresh enter command, by putting the memory in an idle state, etc.). During the self-refresh mode, the self-refresh logic circuit 260 may control refresh operations without the need for external commands such as REF and RFM. For example, during the self-refresh mode the self-refresh logic circuit 260 may periodically output a refresh signal. Responsive to the refresh signal the sequential refresh address generator may generate a refresh address RXADD and the row decoder 208 performs a refresh operation. In some embodiments, the self-refresh logic 260 may only perform sequential refresh operations in the self-refresh mode. In some embodiments, the self-refresh logic 260 may check a state of the queue 244, and may perform a mix of targeted and sequential refresh operations (e.g., by providing refresh signals and targeted refresh signals) until the queue is empty 244.

The refresh control circuit 216 includes an aggressor detector circuit 217 which determines aggressor addresses to be stored in the aggressor queue 244. Various schemes may be used to determine if an address is an aggressor. As described in more detail herein, FIG. 2 is shown with respect to an embodiment where counter memory cells 226 are used. However other schemes for detecting aggressors may be used in other example embodiments. In some embodiments, an address may be identified as an aggressor through random sampling. For addresses XADD which are accessed may be randomly selected and added to the queue 244. In some embodiments, accesses to different addresses may be tracked. For example, each time an address is accessed it may be added to a register and a count associated with that entry in the register may be changed (e.g., incremented). If the count passes a threshold, then the address is added to the queue 244.

In the example embodiment shown in FIG. 2, counter memory cells 226 in the memory array 218 are used to track an access count associated with that word line. The aggressor detector circuit 217 includes a counter circuit 248 which updates the count value XCount of the accessed word line, and a comparator circuit 246 which determines if the address XADD is an aggressor based on the updated count value.

When a row of the memory array 218 is accessed, the values of the counter memory cells 226 along that row are read to the counter circuit 246. For example, the counter memory cells 226 may store the bits of a binary number that represents the count value. For example, if the number is a 16-bit number, then 16 or more counter memory cells may store the bits of the number. The counter 246 may determine a value of the access count for that row based on the values read from the counter memory cells 226. The counter 246 may be a count control circuit, which may manage a value of the count stored in the counter memory cells 226 (e.g., by reading the raw data in the counter memory cells 226 as a numerical value, writing new numerical values to the counter memory cells 226 etc.). The counter circuit 246 may change the count value (e.g., by incrementing the count value) and provide the changed count value to a threshold comparator 246, which may determine if the value of the changed count crosses a threshold (e.g., if the value is greater than or greater than or equal to the threshold). If the value does not cross the threshold (e.g., if the value is less than or equal to or less than the threshold), then the counter circuit 248 may write the changed count back to the counter memory cells 226. If the value does cross the threshold, then the current address XADD may be determined to be an aggressor address HitXADD and the threshold comparator circuit 246 provides an aggressor detected signal Agg to the aggressor queue 244. Responsive to the signal Agg, the aggressor address register 244 stores the row address XADD. Also responsive to the signal Agg, the counter circuit 248 may change the count value XCount. In some embodiments, the count value may be reset (e.g., to an initial value) or changed in an opposite direction than the direction it is changed responsive to an access (e.g., if the count is increased for an access, it may be decreased responsive to signal Agg). In some embodiments, the changing of the count value may be inherent. For example, the mitigation threshold MT may be set as a maximum value of the count value XCount, and when XCount reaches that threshold and is incremented again, the count may roll over back to an initial value (e.g., 0).

In some embodiments, the aggressor detector circuit 217 may be located in a region of the memory device closer to the array 218 than the remainder of the refresh control circuit 216. For example, the aggressor detector 217 may be in a bank logic region associated with the array 218, while the remainder of the components may be in a more central region.

Figure 3:
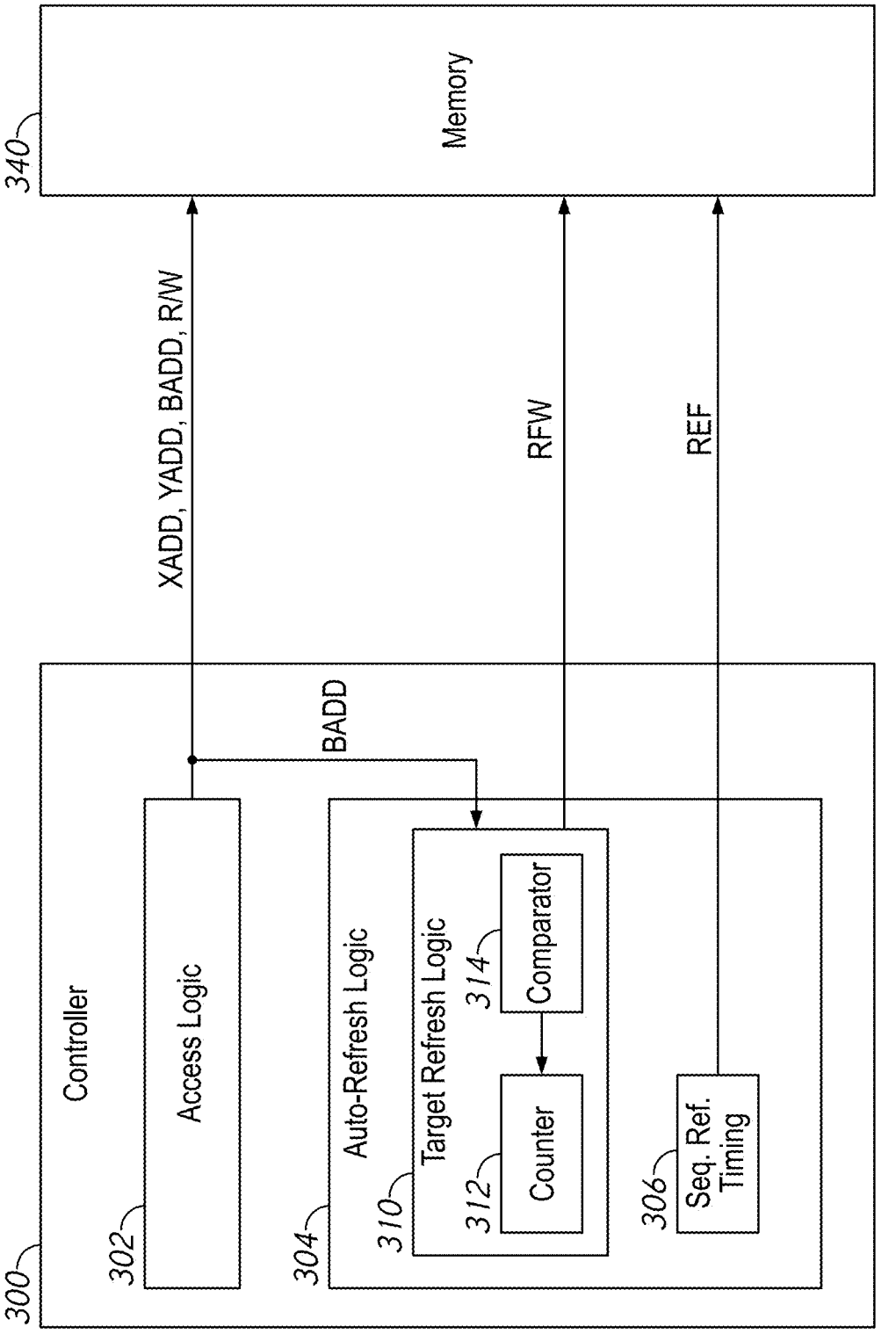
FIG. 3 is a block diagram of a controller according to some embodiments of the present disclosure.

FIG. 3 is a block diagram of a controller according to some embodiments of the present disclosure. The memory 300 may, in some embodiments, implement the controller 150 of FIG. 1. The controller operates a memory 340 (e.g., 100 of FIG. 1). The controller 300 operates the memory 340 by sending and receiving various signals, such as commands, addresses, and/or data along various buses. For the sake of clarity, only certain signals are shown in FIG. 3, and other signals and their buses have been omitted.

The controller 300 includes an access logic circuit 302 which controls when access commands are sent to the memory 340. The access logic 302 may perform an access operation by providing commands and addresses along a C/A bus to the C/A terminal of the memory 340. For example, the access logic 302 may provide a row, column, and bank address (XADD, YADD, and BADD respectively) as well as a command (e.g., a read or write command R/W) along the C/A bus.

The controller 300 also includes an auto-refresh logic circuit 304, which sends refresh commands REF and refresh management commands RFM to the memory 340. The auto-refresh logic circuit 304 includes a sequential refresh timing circuit 306 which provides the refresh commands REF. The sequential refresh timing circuit 306 may use timing logic to determine how often the refresh command REF should be sent. For example, there may be a refresh interval, and the sequential refresh timing circuit 306 may generally send a refresh command REF at least once in each refresh interval. The refresh interval may be based on how quickly information is expected to decay in the memory under 'normal' conditions. In some embodiments, the refresh interval may be adjusted by factors such as a temperature of the memory 340.

The auto-refresh logic circuit 304 also includes targeted refresh logic circuit 310 which tracks accesses to the memory 340 to determine when RFM commands should be sent. The tracking and the RFM commands may be provided on a bank-by-bank basis. For example, the target refresh logic circuit 310 includes a counter circuit 312 which stores count values, each of which is associated with a bank of the memory 340, and a comparator circuit 314 which determines if any of the count values have crossed a threshold. When a bank is accessed, the counter circuit 312 may change the count value associated with that bank. For example, the count may be increased. If the comparator determines that the count for one or more banks has crossed a threshold, then the banks may be flagged as being due for a targeted refresh. When the controller 300 sends an RFM command to one of the flagged banks, the counter circuit 312 may change the count value associated with the bank. For example, the count value may be decreased. In some embodiments, the count value may be decreased by an amount of the threshold.

Figure 4:
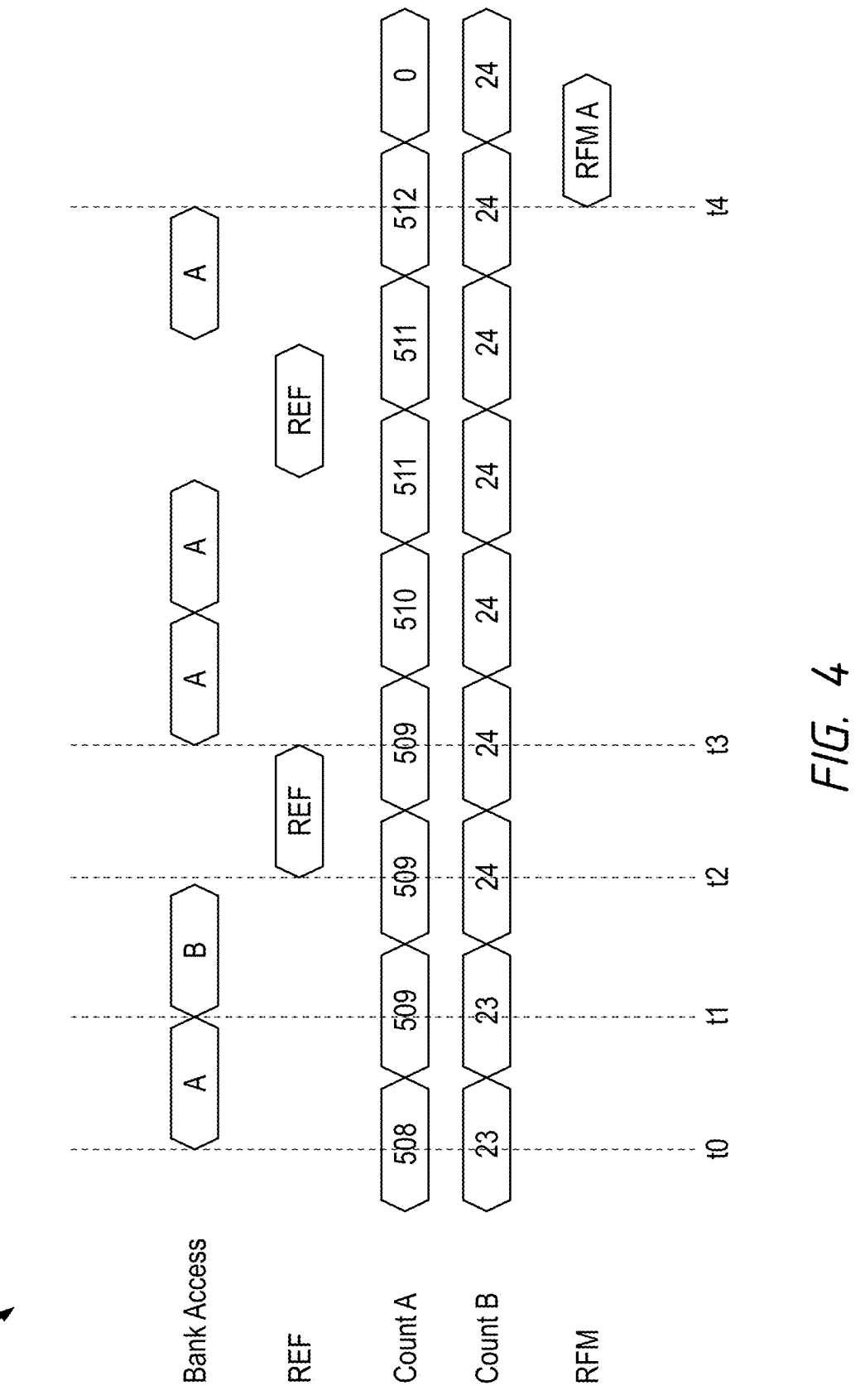
FIG. 4 is a timing diagram of an example operation of a controller according to some embodiments of the present disclosure.

FIG. 4 is a timing diagram of an example operation of a controller according to some embodiments of the present disclosure. The timing diagram 400 may, in some embodiments, represent the operation of a controller, such as the controller 150 of FIG. 1 and/or 300 of FIG. 3. The timing diagram represents a simplified set of operations of a controller to show how accesses to different banks may be tracked and RFM commands issued, for example by an auto-refresh logic circuit such as 304 of FIG. 3. Various operations and timings have been simplified in the view of FIG. 3.

The timing diagram 400 shows accesses to two banks A and B, as well as refresh commands REF which are issued to both banks and RFM commands which are issued to either of the banks. The timing diagram also shows count values (e.g., stored in counter circuit 312 of FIG. 3) each of which is associated with one of the banks. In the example embodiment of FIG. 3, a threshold for sending an RFM command to a bank has been set to 512. Other values may be used in other example embodiments.

At an initial time t0, the counter for bank A is set to 508 and the counter for bank B is set to 23. At a first time t1, just after an access command is issued to Bank A, the count for bank A is 509, and the count for Bank B is still 23. At a time t2, just after an access to bank B, the count for bank A is still 509 and the count for bank B is now 24. At the time t2, a refresh command REF is issued to both banks. At the time t3, just after the refresh command REF, the counts for both banks remain unchanged, at 509 and 24 respectively. Since no targeted refresh operations are performed responsive to the refresh command REF, the two count values are not changed responsive to REF commands.

After the time t3, several additional accesses are performed on Bank A, until its count value reaches the threshold of 512. Responsive to this, at t a time t4, an RFM command is issued to bank A. Responsive to this, the count value for bank A is reduced. For example, the threshold value of 512 may be subtracted from the count for bank A. In this example that resets the count to an initial value of 0.

Figure 5:
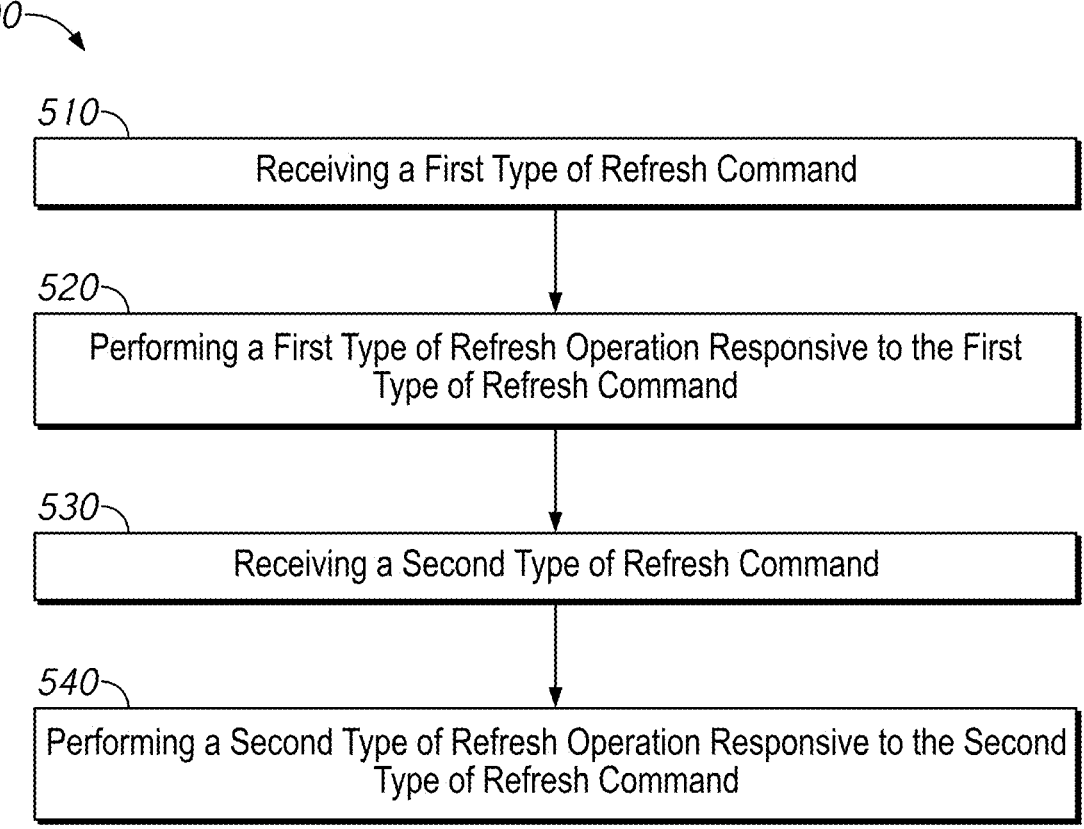
FIG. 5 is a flow chart of a method according to some embodiments of the present disclosure.

FIG. 5 is a flow chart of a method according to some embodiments of the present disclosure. The method 500 may in some embodiments, be implemented by one or more of the systems and apparatuses described herein, such as by a memory (e.g., 100 of FIG. 1, 200 of FIG. 2, and/or 340 of FIG. 3) and controller (e.g., 150 of FIG. 1 and/or 300 of FIG. 3).

The method 500 includes block 510, which describes receiving a first type of refresh command. The method 500 may include a controller providing the first type of refresh command along a C/A bus to the memory. The fist type of refresh command may be a refresh command REF. The method 500 may include a generating the refresh signal with timing based on a refresh interval with a sequential refresh timing circuit (e.g., 306 of FIG. 3).

Block 510 may be followed by block 520, which describes performing a first type of refresh operation responsive to the first type of refresh command. For example, the method 500 may include performing a sequential refresh operation with a memory responsive to receiving the first type of refresh command. Performing the sequential refresh operation may include generating a refresh address with a sequential refresh address generator circuit (e.g., 252 of FIG. 2). Generating the refresh address may involve generating the sequential refresh address based on a previous refresh address generated responsive to the first type of refresh command.

The method 500 also includes block 530, which describes receiving a second type of refresh command. The method 500 may include the controller providing the second type of refresh command along the C/A bus to the memory. The second type of refresh command may be an RFM command. The method 500 may include tracking accesses to banks of the memory and providing the RFM command responsive to the accesses crossing a threshold. For example, the controller may store a plurality of count values, each associated with a bank, and the method 500 may include changing one of the plurality of count values responsive to accessing the bank. The method may include providing the RFM command to that bank responsive to the count crossing a threshold. The method 500 may include changing the count value responsive to providing the RFM command. The method 500 may include not changing the count value responsive to providing the REF command.

Block 530 may be followed by block 540, which describes performing a second type of refresh operation responsive to the second type of refresh command. For example, the method 500 may include performing a targeted refresh operation with the memory responsive to the second type of refresh command. Performing the targeted refresh operation may include generating the refresh address with a targeted refresh address generator circuit (e.g., 254 of FIG. 2). The method 500 may include identifying an aggressor address (e.g., with aggressor detector 217 of FIG. 2) and storing the identified aggressor in an aggressor queue (e.g., 244 of FIG. 2). The method 500 may include generating the refresh address based on the identified aggressor address in the queue responsive to the second type of refresh command.

The method 500 may include refreshing one or more word lines of the memory array responsive to the refresh address which is generated responsive to either the first or the second type of refresh command. The method 500 may include entering the memory into a self-refresh mode and periodically generating a refresh signal within the memory while in the self-refresh mode and performing the first type of refresh operation responsive to the refresh signal.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   an aggressor address queue configured to store aggressor addresses;
   a sequential refresh address generator circuit configured to generate a refresh address based on sequence logic responsive to a refresh command;
   a targeted refresh address generator configured to generate the refresh address based on an aggressor address of the aggressor addresses stored in the aggressor address queue responsive to a refresh management command; and a self-refresh logic circuit configured to check a state of the aggressor address queue and generate a mix of at least one refresh signal and at least one targeted refresh signal until the aggressor address queue is empty during a self-refresh mode, wherein the refresh command and the refresh management command are provided together by a controller coupled to the apparatus, wherein the sequential refresh address generator circuit is configured to generate the refresh address based on the sequence logic responsive to the at least one refresh signal, and wherein the targeted refresh address generator is configured to generate the refresh address based on the aggressor address of the aggressor addresses stored in the aggressor address queue responsive to the at least one targeted refresh signal.

2. The apparatus of claim 1, wherein the targeted refresh address generator does not generate the refresh address responsive to the refresh command and the sequential refresh address generator circuit does not generate the refresh address responsive to the refresh management command.

3. The apparatus of claim 1, further comprising:
a memory array; and
a row decoder,
wherein the row decoder is configured to refresh one or more word lines of the memory array associated with the refresh address.

4. The apparatus of claim 1, further comprising an aggressor detector circuit configured to identify the aggressor address.

5. The apparatus of claim 4, further comprising:
a memory array including a plurality of word lines, each of which is configured to store a count value associated with the word line, wherein the aggressor detector circuit is configured to identify the aggressor address based on the count value.

6. A system comprising:
a controller configured to provide a refresh command and a refresh management command together; and
a memory coupled to the controller and configured to perform a sequential refresh operation but not a targeted refresh operation responsive to the refresh command and configured to perform the targeted refresh operation but not the sequential refresh operation responsive to the refresh management command,
wherein the memory is further configured to perform a mix of at least one sequential refresh operation and at least one targeted refresh operation responsive to the refresh command and the refresh management command being provided together.

7. The system of claim 6, wherein the memory includes a plurality of banks and wherein responsive to the refresh management command the memory performs the targeted refresh operation on a selected one of the plurality of banks.

8. The system of claim 6, wherein the controller comprises a counter circuit which stores a plurality of count values, each associated with one of a plurality of banks of the memory, and
wherein responsive to providing the refresh management command but not responsive to providing the refresh command, one of the plurality of count values is changed.

9. The system of claim 8, wherein responsive to the controller providing an access command the counter circuit changes one of the plurality of count values.

10. The system of claim 6, wherein the memory includes a refresh address generator with a sequential refresh address generator circuit and a targeted refresh address generator circuit,
wherein responsive to the refresh command the sequential refresh generator circuit but not the targeted refresh address generator circuit provides a refresh address, and
wherein responsive to the refresh management command the targeted refresh address generator circuit but not the sequential refresh address generator circuit provides the refresh address.

11. The system of claim 6, wherein the memory includes an aggressor detector circuit configured to identify an aggressor address, wherein the targeted refresh address generator circuit is configured to generate the refresh address based on the aggressor address.

12. The system of claim 6, wherein the controller is configured to enter the memory into a self-refresh mode, and wherein the memory is configured to perform sequential refresh operations during the self-refresh mode.

13. A method comprising:
receiving, from a controller, a first type of refresh command and a second type of refresh command together at a memory; and
performing a mix of a first type of refresh operations and a second type of refresh operations responsive to receiving the first type of refresh command and the second type of refresh command together.

14. The method of claim 13, further comprising:
performing the first type of refresh operation but not the second type of refresh operation responsive to the first type of refresh command; and
performing the second type of refresh operation but not the first type of refresh operation responsive to the second type of refresh command.

15. The method of claim 13, wherein the first type of refresh command is a refresh command and the first type of refresh operation is a sequential refresh operation, and wherein the second type of refresh command is a refresh management command and the second type of refresh operation is a targeted refresh operation.

16. The method of claim 13, further comprising:
identifying an aggressor address and storing the aggressor address in an aggressor queue; and
generating a refresh address based on the aggressor address in the aggressor queue responsive to the second type of refresh command.

17. The method of claim 13, further comprising generating the refresh address responsive to the first type of refresh command based on a previous refresh address generated responsive to the first type of refresh command.

18. The method of claim 13, further comprising:
providing access commands to a bank of the memory:
changing a count value in a first direction responsive to providing the access commands;
providing the second type of refresh command responsive to the count value crossing a threshold; and
changing the count value in a second direction responsive to providing the second type of refresh.

19. The method of claim 18, further comprising periodically providing the first type of refresh command and not changing the count value responsive to the first type of refresh command.

* * * * *